United States Patent [19]

Gusching et al.

[11] 4,075,753
[45] Feb. 28, 1978

[54] PLURAL SLIDE MACHINE

[75] Inventors: Nagle V. Gusching; Kermit T. Kuck, both of Sidney, Ohio

[73] Assignee: The Monarch Machine Tool Company, Sidney, Ohio

[21] Appl. No.: 623,435

[22] Filed: Oct. 17, 1975

[51] Int. Cl.² .................... B23C 1/14; B23Q 3/157
[52] U.S. Cl. .................... 29/568; 90/15 R; 90/58 R; 90/58 B; 269/56; 408/71
[58] Field of Search .................... 29/568; 408/70, 71; 90/58 R, 15 R, 58 B; 51/215 CP; 269/56

[56] References Cited

U.S. PATENT DOCUMENTS

| 2,837,975 | 6/1958 | Johnson | 90/58 R X |
| 3,543,392 | 12/1970 | Perry et al. | 29/568 X |
| 3,691,655 | 9/1972 | Kurimoto et al. | 29/568 |

*Primary Examiner*—Z. R. Bilinsky

*Attorney, Agent, or Firm*—Woodling, Krost, Granger & Rust

[57] ABSTRACT

A plural slide machine is disclosed for machining a first and a second workpiece comprising a first and a second slide for respectively receiving the first and the second workpiece. The first and second slides are mounted on ways for movement in a substantially horizontal plane. A toolholder for holding a workpiece tool is mounted through a third and a fourth slide for enabling movement of the workpiece tool in a substantially vertical plane. Control means is connected to the slides for enabling machining of the first workpiece through movement of the first, third and fourth slide and for enabling machining of the second workpiece through movement of the second, third, and fourth slide. The foregoing abstract is merely a resume of one general application, is not a complete discussion of all principles of operation or applications, and is not to be construed as a limitation on the scope of the claimed subject matter.

15 Claims, 5 Drawing Figures

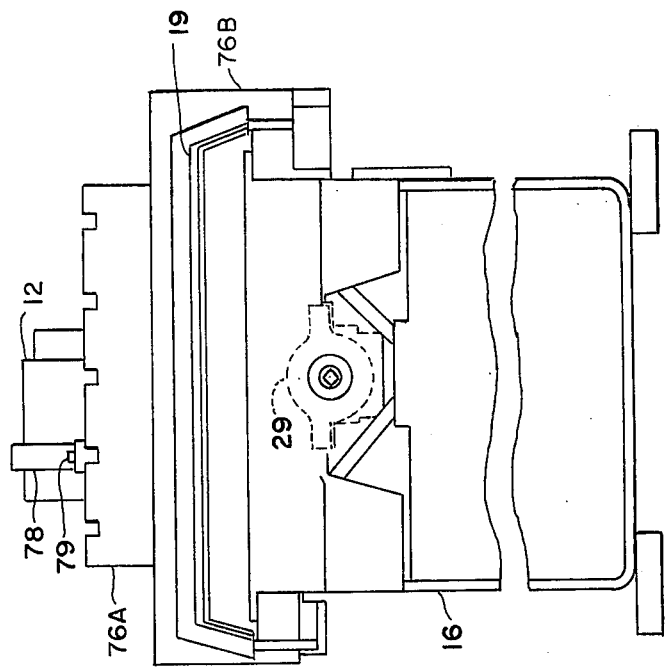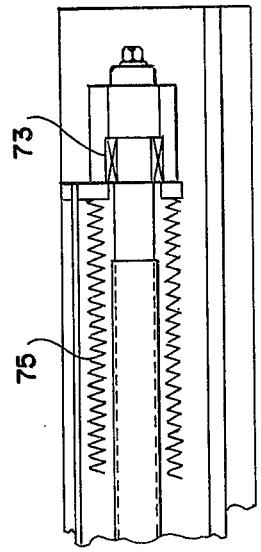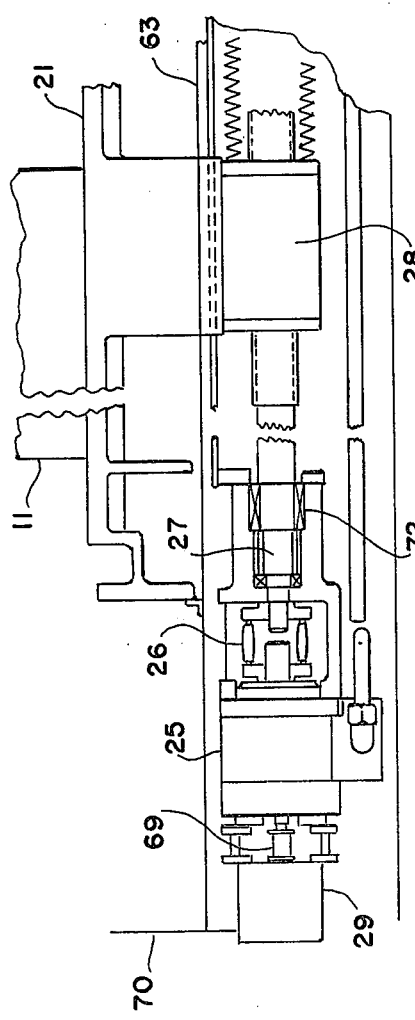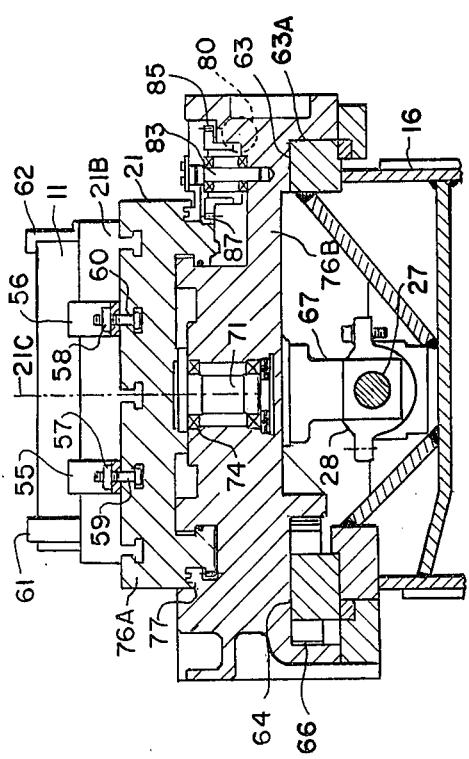

PLURAL SLIDE MACHINE

BACKGROUND OF THE INVENTION

1. Field of the Invention

This invention relates to machine tools and more particularly to machine tools having means for holding a first and a second workpiece.

2. Description of the Prior Art

The prior art knows many types of machines for holding a first and a second workpiece. The basic advantage of this type of machine is an increase in the percentage of actual machining time and a decrease in the percentage of workpiece installation or set-up time over a single workpiece machine. The plural workpiece machines generally have a first and a second workpiece mounting unit each of which is movable between a standby position and a machining position. While one workpiece, for example, the first workpiece is being machined on the first workpiece mounting unit, a second workpiece can be mounted on the second workpiece mounting unit which is located in the standby position. After machining of the first workpiece, the first workpiece is shifted to the standby position and the second workpiece is shifted to the machining position. The first workpiece can them be removed and replaced by a third workpiece on the first mounting unit during machining of the second workpiece.

The plural workpiece principle is incorporated in various types of machines one of which includes a single horizontal slide having a first and a second mounting unit on the ends of the slide. While the first workpiece on the first mounting unit is being machined the second workpiece can be installed on the second mounting unit in the standby position. Upon completion of machining of the first workpiece, the first mounting unit is moved to the standby position enabling machining of the second workpiece. The first workpiece can then be removed allowing installation of a third workpiece. The basic disadvantage of this machine is that the mounting unit in the standby position moves in accordance with the movement of the mounting unit in the machining position.

Others in the prior art use a pallet shuttle system, for example, U.S. Pat. No. 3,099,873. The pallet shuttle system includes a first and a second pallet having first and second mounting units. The machine has a standby position and a machining position. The pallets are loaded with workpieces in the standby position and are individually moved to the machining position for machining by a workpiece tool. Tapered pins on the upper side of a slide in the machining position engage with tapered holes on the bottom side of the pallet to locate the pallet in the machining position. Upon completion of the machining of the first workpiece on the first pallet, the pallet is quickly moved to the standby position and the second pallet is moved to engage with the tapered pins of the slide in the machining position to enable machining of a second workpiece.

The pallet shuttle system operates satisfactorily but is inaccurate due to errors resulting from locating the pallets on the slide in the machining position. Those skilled in the are realize that tolerance errors are accumulative and manufacturers of high quality machine tools strive to minimize accumulative error to maintain the quality and standard of their machine tools. In the pallet shuttle system, a first error is introduced upon placing the workpiece on the pallet. A second error is introduced upon locating the pallet on the slide in the machining position through the tapered pins. Finally, a third error is introduced in the mechanism for moving the tool relative to the workpiece. Accordingly, three sources of error accumulate in each direction in the pallet shuttle system.

Therefore, an object of this invention is to overcome the aforementioned disadvantages of the plural mounting units on a single slide and the pallet shuttle system by providing a machine tool capable of rapid machining of plural workpieces with higher accuracy then heretofore possible.

Another object of this invention is to provide a machine tool with plural slides which has only two accumulative errors in each direction rather than three accumulative errors found in the pallet shuttle system.

Another object of this invention is to provide a machine tool with plural slides for machining a first workpiece in a machining position with a second workpiece in a standby position and for interchanging the status of the first and second workpieces without the use of a pallet shuttle system.

Another object of this invention is to provide a machine tool with plural slides wherein each slide has a table which is rotatable about an axis which is perpendicular to the direction of movement of the slides.

Another object of this invention is to provide a machine tool with plural slides having novel control means for controlling the machining of the first and second workpieces through a single control system.

Another object of this invention is to provide a machine tool with plural slides which is inherently more accurate than the pallet shuttle system.

SUMMARY OF THE INVENTION

The invention may be incorporated in a plural slide maching for machining a first and a second workpiece by a workpiece tool, comprising in combination, a frame, first and second slide means, first and second mountings on said first and second slide means for securing the first and the second workpiece, respectively, way means mounted relative to said frame for receiving said first and second slide means enabling movement thereof along a substantially horizontal plane, means for moving said first and second slide means on said way means, third slide mean, means for mounting said third slide means for movement relative to said frame in a substantially vertical plane, means for moving said third slide means, a toolholder for holding the workpiece tool, means for mounting said toolholder for movement with said third slide means, fourth slide means enabling movement between said toolholder and the first and second workpieces on said first and second slide means, and control means connected to said slide means for enabling machining of the first workpiece through movement of said first, third, and fourth slide means and for enabling machining of the second workpiece through movement of said second, third, and fourth slide means.

BRIEF DESCRIPTION OF THE DRAWINGS

FIG. 3 is an enlarged sectional view along line 3—3 of FIG. 2;

FIG. 4 is an enlarged sectional elevational view of a portion of the machine shown in FIGS. 1 and 2; and FIG. 5 is an enlarged end view of a portion of the machine shown in FIGS. 1 and 2;

DESCRIPTION OF THE PREFERRED EMBODIMENT

Figure 1:
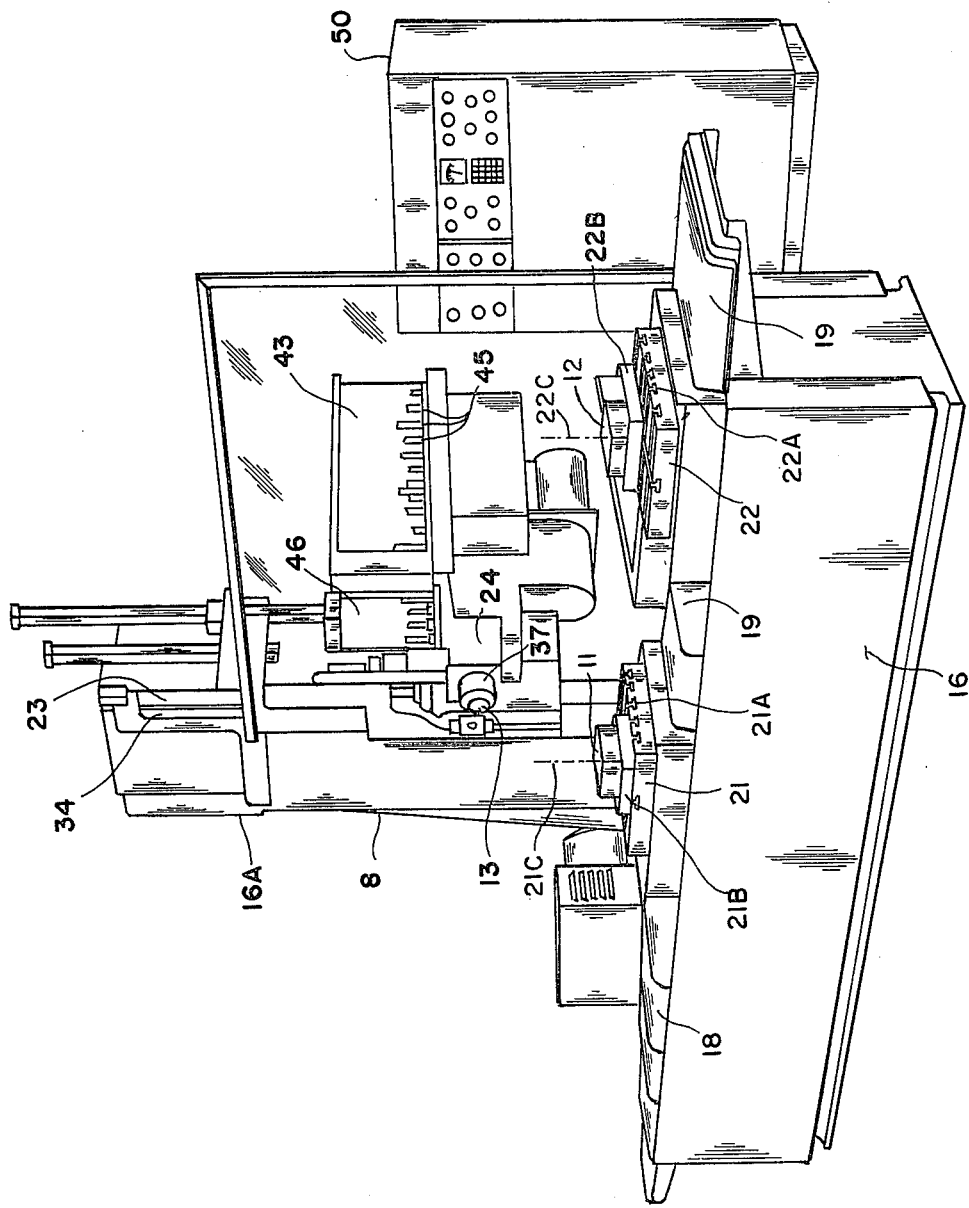
FIG. 1 is a perspective view of a machine tool with plural slides which is the preferred embodiment of the present invention.
Figure 2:
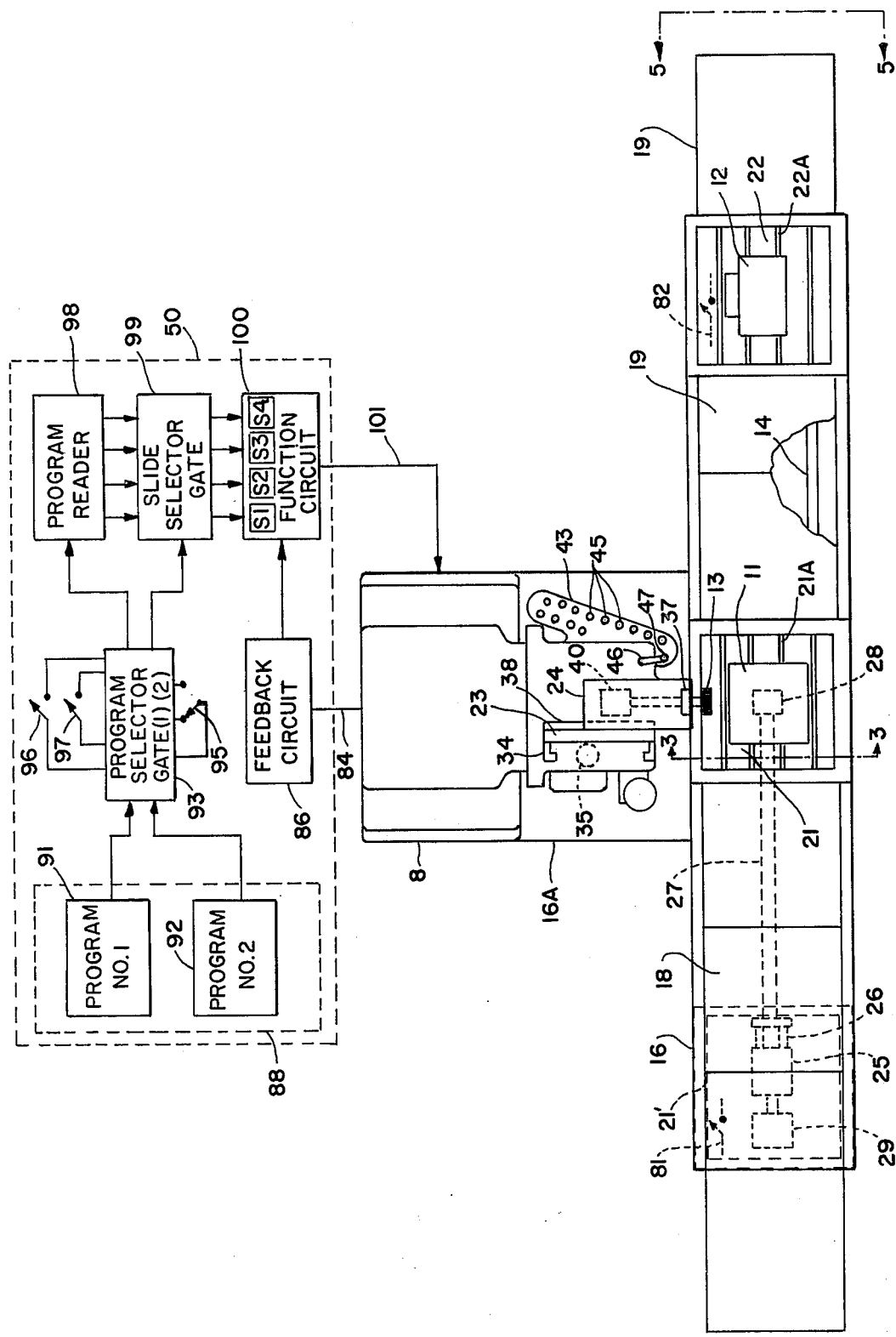
FIG. 2 is a top view of the machine tool shown in FIG. 1.

FIG. 1 and FIG. 2 are respectively perspective and top views of a machine tool 8 for machining a first and a second workpiece 11 and 12 by a workpiece tool 13. The machine tool 8 comprises a frame 16 including way means 14 covered by way shields 18 and 19 which way means receives a first and a second slide means 21 and 22. The way means 14 may be a single pair of ways extending the length of the machine tool 8 or may be two separate pairs of ways for the first and second slides 21 and 22. The way means 14 enable movement of the first and second slides 21 and 22 in a substantially horizontal plane and in this embodiment along a common horizontal line. The first and second slides 21 and 22 include first and second mounting units shown as fixtures 21B and 22B and T-slots 21A and 22A for receiving mounting bolts to secure the fixtures. Means are provided for moving the first and second slides 21 and 22 on the way means 14 which includes a motor 25 coupled through a universal coupling 26 to a rotatable screw 27 which cooperates with a nut 28 secured to the first slide 21. A resolver 29 is connected to the shaft of motor 25 to indicate the exact position of the first slide 21 relative to the frame 16. Similar means including a separate motor move the second slide 22 but is not shown for the sake of simiplicity.

Third slide means 23 is mounted by guide 34 on a substantially vertical portion 16A of the machine frame 16 for enabling relative movement of the third slide 23 in a substantially vertical plane and in this embodiment along a substantially vertical line. A motor 35 effects movement of the third slide 23 through a screw (not shown) in a manner similar to the motor 25 and screw 27 shown for the first slide 21. A resolver (not shown) is connected for movement with the shaft of motor 35 for indicating the exact position of the slide 23 relative to the vertical portion 16A of the frame 16. A toolholder 37 shown as a chuck is mounted for movement with the third slide 23 through a fourth slide 24. The fourth slide 24 moves on guide 38 in a direction substantially perpendicular to the vertical movement of the third slide 23 enabling compound movement of the toolholder 37 and tool 13 in a substantially vertical plane which is perpendicular to the plane of movement of the first and second slides 21 and 22. A similar motor, resolver and screw assembly may be used for effecting movement of the fourth slide 24 along the guide 38. A toolholder motor 40 is attached to the toolholder 37 for effecting rotation of the tool 13 for machining the first and the second workpieces 11 and 12. The mounting units 21B and 22B on the tables of the first and second slides 21 and 22 are each rotatable about axes 21C and 22C as will be hereinafter described.

A tool storage means 43 is mounted for movement with the third slide 23. The tool storage means 43 includes a magazine for holding a plurality of different tools 45. Tool changer means 46 enables changing of the workpiece tool 13 from the toolholder 37 to the tool storage means 43. For example, if tool 13 is to be changed, the tool changer removes the tool 13 and places it in the proper empty socket in the magazine. The moveable magazine in the tool storage means 43 then will index until the proper tool in storage, for example tool 47, is adjacent the tool changer means 46. The tool changer 46 removes the tool 47 from the magazine and inserts it into the toolholder 37.

The invention includes control means 50 for controlling the slides 21–24, the toolholder motor 40, the movable magazine in the tool storage means 43, and the tool changer 46. The control 50 enables machining of the first workpiece 11 through movement of the first slide 21, the third slide 23, and the fourth slide 24 when the first slide 21 is in a machining position (as shown) and while the second slide 22 is in the standby position (as shown). The control 50 also enables machining of the second workpiece 12 on the second slide 22 when the slide 22 is located in the machining position (shown by slide 21) through movement of the second slide 22, the third slide 23, and the fourth slide 24 while the first slide 21 is in a standby position shown by the phantom ountling 21' in FIG. 2. Accordingly, the first workpiece 11 is machined while the second workpiece 12 is being secured to the second slide. The control means 50 also controls the rotation of the mounting units 21B and 22B of the first slide 21 and the second slide 22. Those in the art will appreciate that the second slide 22 remains completely inactive during the machining of the first workpiece 11 to facilitate installation of the second workpiece 12 on the second slide 22. In addition, automatic tool changing during the machining of the first workpiece 11 is available through the control 50. Similarly, the first slide 21 can be moved to the standby position 21' and remain completely inactive during the machining of the second workpiece 12 to facilitate removal of the first workpiece 11 and installation of a third workpiece on the first slide 21. The slides 21 and 22 are each mounted on ways and each slide is powered by a motor/screw assembly eliminating the intrinsic error of locating the pallet in the machining position found in the pallet shuttle system. In the present system, only two errors are introduced in each direction rather than the three errors of the pallet shuttle system. The first error is introduced in locating the workpiece on the slide. The second error is introduced by the imperfections of the motor/screw assembly. The pallet shuttle system has not only these two errors but has the additional error introduced by locating the pallet in the machining position. Accordingly, the present invention is intrinsicly more accurate then the pallet shuttle system and will produce a more accurate workpiece than a pallet shuttle machine of equal quality.

FIG. 3 is a partial sectional view along line 3—3 of FIG. 2. The workpiece 11 is secured to the first slide 21 by the fixture 21B held by clamps 55 and 56 mounted by threaded fasteners 57 and 58 to T-slots 59 and 60. The workpiece 11 is then secured to the fixture 21B by clamps 61 and 62. The slide 21 moves on the way means including way surfaces 63 and 64 of the frame 16 with a recirculating linear ball bearing assembly 66 and a vertical way surface 63A insuring that the movement of the slide 21 proceeds along a straight line upon rotation of the motor 25. A housing 67 mounted to the underside of the first slide 21 contains the nut 28 shown in FIG. 2 for cooperation with screw 27.

The first slide 21 may be a simple slide but preferably includes means for enabling rotation of the fixture 21B about an axis 21C which is substantially perpendicular to the direction of movement of slide 21 along way surfaces 63 and 64. The slide 21 comprises an upper member 76A and a lower member 76B. The upper member 76A includes a substantially vertical shaft 71 which is journaled by bearings 74 relative to the lower member 76B. The lower member 76B contacts the way surfaces 63 and 64. The upper member 76A appears rectangular from a view external the machine but has a circular labyrinth portion 77 inside the machine. The upper member 76A and the lower member 76B form the circular labyrinth 77 to prevent coolant fluid from entering the bearings 74. A motor 80 mounting to the lower member 76B operates through a shaft 83 and a gear 85 to engage with teeth 87 on a lower circular portion of the upper member 76A. Accordingly, rotation of motor 80 rotates shaft 83 and gear 85 to cause rotation of the upper member 76A relative to the lower member 76B about the axis 21C. The motor 80 may be connected to a resolver (not shown) for signal feedback through conductor 84 and feedback circuit 86 for indicating to the control means 50 the position of the upper member 76A relative to the lower member 76B of the first slide 21. The motor 80 is controlled by the control means 50 in order to enable machining of all sides of the workpiece 11 by the workpiece tool 13.

The second slide 22 is substantially identical to the first slide and is independently rotatable of the first slide irrespective of whether the second slide is in the machining positon or in the standby position.

FIG. 4 is an enlarged partial sectional elevational view of the motor screw drive assembly for the first slide 21 shown in phantom in FIG. 2. The shaft of motor 25 is connected through a coupling 69 to the resolver 29 to provide an electrical feedback signal on an electrical conductor 70 to the control 50 for indicating the position of the first slide 21 relative to the frame 16. The other end of the shaft of motor 25 is connected through the universal coupling 26 to screw shaft 27. The screw shaft 27 is journalled by bearings 72 and 73 and is located substantially parallel to way surface 63. An accordian cover material 75 prevents machining chips, dirt, or the like from entering the threads of screw 27. Screw 27 engages with the nut 28 secured to slide 21 for providing accurate machining movement of the first workpiece 11 in a horizontal direction along ways 63 and 64.

FIG. 5 is an enlarged end view along line 5—5 of a portion of the machine tool 8 shown in FIG. 2. The second slide 22 is shown in the standby position enabling mounting of the workpiece 12 on the second slide 22 as illustrated by the single clamp 78 secured by a single threaded fastener 79 in the T-slot. The way shields 19 for protecting the way surfaces 63 and 64 are more clearly shown in FIG. 5 relative to the frame 16.

FIG. 2 shows a block diagram of the internal components of the means 50 used for enabling automatic operation of the machine tool 8. Limit switches 81 and 82 are mounted on the frame 16 in a position to be actuated by the slides 21 and 22 when in standby position for furnishing information through a connector means 84 to a feedback circuit 86 for indicating the locations of the first and second slides 21 and 22. Feedback from the toolholder motor 40, tool changer 46, and the resolvers including resolver 29 are likewise supplied on connector means 84 to the feedback circuit 86.

The control means 50 comprises programmable memory means 88 including a first and a second program 91 and 92. The first and second programs 91 and 92 are applied to a program selector gate 93 having switchable logic shown as a program selector switch 95 for determining which of the first and second programs is transferred to a program reader 98. If switch 95 is connected to the (1) line then the first program is applied to the program reader 98 whereas if the switch 95 is connected to the (2) line, then the second program is applied to the program reader 98. The program reader 98 transfers the selected one of the first and second programs 91 and 92 to a slide selector gate 99 which in turn transfers signals from the program reader 98 to the function circuit 100. The function circuit 100 shows four sections $S_1$–$S_4$ which symbolize control of slides 21–24 respectively. The slide selector gate 98 determines which one of $S_1$ or $S_2$ receives information from the program reader 98. The program selector gate 93 is connected directly to the slide selector gate 99 to switch between $S_1$ and $S_2$ and consequently effect control of the first and second slides 21 and 22. The function circuit 100 is connected through connector 101 for supplying control function to the slides 21–24, tool changer 46, tool storage means or tool magazine 43 and toolholder motor 40.

Switches 96 and 97 are cycle start switches for starting each cycle. Switches 96 and 97 may alternatively be used for indicating whether a machining cycle is appropriate for the first and second slides 21 and 22, respectively. For example, if the first workpiece 11 is installed on the first slide 21 then switch 96 may be closed to initiate the machining of the first workpiece blank 11. Means (not shown) may be connected to switch 95 to automatically provide the first program 91 to the first slide 21 and provide the second program 92 to the second slide 22 through the slide selector gate 99 unless a manual overide is activated. The first program 91 is decoded by the program reader 98 to provide machining operation of the first workpiece 11 on the first slide 21. Concomitantly the second workpiece blank 12 is installed on the second slide 22 and upon completing installation of the second workpiece blank 12 switch 97 is closed to indicate that the second workpiece 12 is prepared for machining. Upon completion of the first program 91 and machining of the first workpiece 11, limit switches 81 and 82 indicate to the control means 50 that the first and second slides 21 and 22 must be shifted. Accordingly, the first slide 21 is moved to the standby position 21' and the second slide is simultaneously moved to the machining position. In this embodiment, the first and second slides move simultaneously due to physical limitations in the length of the way shields between the first and second slides 21 and 22. The simultaneous movement also eliminates the possibility of both the first and second slides 21 and 22 being moved toward the machining position at the same time. Switch 96 may be a momentary contact switch or may be set to automatically open to insure that the switch 96 must be reset before the first slide 21 is again moved to the machining position. The control means 50 may automatically move switch 95 into contact with the (2) connector enabling the second protram 92 to be decoded by the program reader 98, and to control the machining of the second workpiece 12. The change in status of limit switches 81 and 82 signals the control 50 that a slide shift is required before the first slide 21 is in the machining position. The finished workpiece 11 is removed from the first slide 21 and a third workpiece blank is installed thereon. After installation of the third workpiece blank switch 96 is closed indicating the third workpiece is prepared for machining. After machining of the second workpiece 22, the limit switches 81 and 82 indicate that a slide shift is required. Accordingly, the control means 50 moves the first slide 21 to the machining position (as shown) and simultaneously moves the second slide 22 to the standby position (as shown). In addition, switch 95 is connected to the (1) line providing the first program 91 to the program reader 98 and changing the slide selector gate 99 to S₁ or the first slide 21. The program selector gate 93 and slide selector gate 99 allow the use of the first program 91 or the second program 92 for either of the slides or one program can be used for both of the slides. In addition, the control means 50 indexes the movable magazine in either direction in the tool storage means 43 such that the minimum distance is moved in order to select the proper tool. The first and second slides 21 and 22 have been shown to coexist on common ways extending the length of the machine however, it is understood that two separate way means can be incorporated in the present invention whereby the first and second mountings units 21A and 22A may move in two directions of a horizontal line.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A plural slide machine for machining a first and a second workpiece by a workpiece tool, comprising in combination:
   a frame;
   first and second slide means;
   first and second mountings on said first and second slide means for securing the first and the second workpiece, respectively;
   way means mounted relative to said frame receiving said first and second slide means enabling movement thereof along a substantially horizontal plane;
   third slide means;
   means mounting said third slide means for movement relative to said frame in a substantially vertical plane;
   means connected for moving said third slide means;
   a toolholder for holding the workpiece tool;
   means mounting said toolholder for movement with said third slide means;
   fourth slide means enabling third dimensional movement between said toolholder and the first and second workpieces on said first and second slide means;
   means connected to move said fourth slide means;
   first drive means connected continuously to said first slide means for moving said first slide means on said way means for machining movements and to a standby position remote from said toolholder;
   second drive means connected continuously to said second slide means for moving said second slide means on said way means for machining movements and to a standby position remote from said toolholder;
   and control means connected to said slide means for enabling machining of the first workpiece through movement of said first, third, and fourth slide means and for enabling machining of the second workpiece through movement of said second, third, and fourth slide means.

2. A machine as set forth in claim 1, wherein said way means for said first and second slide means enables movement of said first and second slide means along a common line of direction.

3. A machine as set forth in claim 2, wherein said common line of direction is substantially perpendicular to said vertical plane.

4. A machine as set forth in claim 1, wherein said first and second drive means for moving said first and second slide means on said way means includes means for independently moving said first and second slide means.

5. A machine as set forth in claim 1, wherein said second slide means is movable to a standby position during machining of the first workpiece and wherein said first slide means is movable to a standby position during machining of the second workpiece.

6. A machine as set forth in claim 1, wherein said control means includes a first and a second programmable memory unit connected for commanding machining of the first and second workpieces, respectively.

7. A machine as set forth in claim 1, including tool storage means mounted adjacent the machine for holding a plurality of workpiece tools;
   tool changer means connected for changing workpiece tools between said tool storage means and said toolholder;
   and means connecting said control means to said tool changer means for controlling the interchange of workpiece tools between said toolholder and said tool storage means.

8. A machine as set forth in claim 1, wherein said fourth slide means is mounted between said third slide means and said toolholder.

9. A machine as set forth in claim 1, wherein each of said first and second slides has a machining position and a standby position;
   and including sensor means connected for indicating to said control means in which of said machining and standby positions each of said first and second slides is located.

10. A machine as set forth in claim 1, wherein said control means includes a programmable memory means having a first and a second program;
    program selector means connected for receiving input from said programmable memory means for selecting one of said first and second programs;
    a program reader connected for decoding said selected one of said first and second programs;
    a machine function circuit;
    slide detector means connecting said program reader to said function circuit for controlling one of said first and second slide means;
    and a feedback circuit connected to said function circuit for indicating the position of said slides.

11. A machine as set forth in claim 1, including means connected for enabling relative rotational movement between said third slide and said first and second mountings on said first and second slide means.

12. A machine as set forth in claim 1, including means connected for enabling rotation of said first and second mountings relative to said way means about first and second axes which axes are substantially perpendicular to the movement of said first and second slide means.

13. A plural slide machine for machining a first and a second workpiece by a workpiece tool, comprising in combination:
    a frame;
    first and second slide means;

first and second mountings on said first and second slide means for securing the first and the second workpiece, respectively;

way means mounted relative to said frame receiving said first and second slide means enabling movement thereof along a substantially horizontal common line of direction;

third slide means;

means mounting said third slide means for movement relative to said frame in a substantially vertical plane which is substantially perpendicular to said common line of direction;

means connected for moving said third slide means;

a toolholder for holding the workpiece tool;

means mounting said toolholder for movement with said third slide means;

fourth slide means enabling third dimensional movement between said toolholder and the first and second workpiece on said first and second slide means;

means connected to move said fourth slide means;

first drive means connected continuously to said first slide means for moving said first slide means on said way means for machining movements and to a standby position remote from said toolholder;

second drive means connected continuously to said second slide means for moving said second slide means on said way means independent of movement of said first slide means for machining movements and to a standby position remote from said toolholder;

tool storage means mounted adjacent the machine for holding a plurality of tools;

tool changer means connected for changing tools between said tool storage means and said toolholder;

control means comprising programmable memory means and a function circuit;

means connecting said machine function circuit to said means for moving said slide means and said tool changer means;

feedback means interconnecting said slide means and said control means for indicating the position of said slide means;

and said programmable memory means including a first and a second program selectably applied to said function circuit for respectively enabling machining of the first workpiece through movement of said first, third, and fourth slide means while the second slide means is in a standby position and for enabling machining of the second workpiece through movement of said second, third, and fourth slide means while said first slide means is in a standby position.

14. A machine as set forth in claim 13, wherein each of said first and second slide means includes an upper and a lower member;

means journaling said upper member relative to said lower member;

and means connected for rotating said upper member relative to said lower member.

15. A machine as set forth in claim 14, wherein said means connected for rotating said upper member includes said upper member having a portion thereof having a circular outer periphery;

motor means mounted relative to said lower member;

and means interconnecting said motor means and said outer periphery of said upper member for rotating said upper member upon rotation of said motor means.

* * * * *